Nov. 5, 1940.                H. McINTYRE                 2,220,418
                              VEHICLE
                       Filed March 11, 1939          8 Sheets-Sheet 4
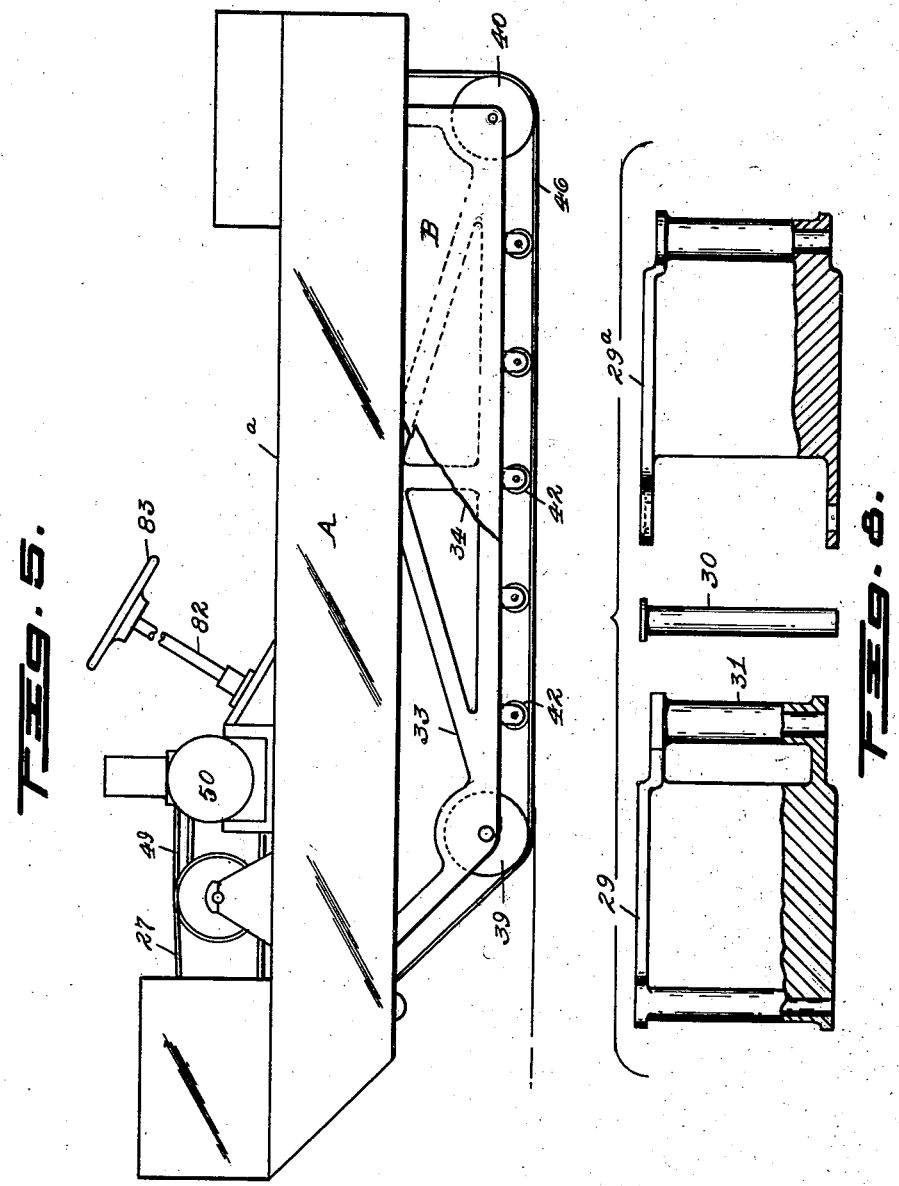
Inventor
Hugh McIntyre
by J. J. ....
    Atty.

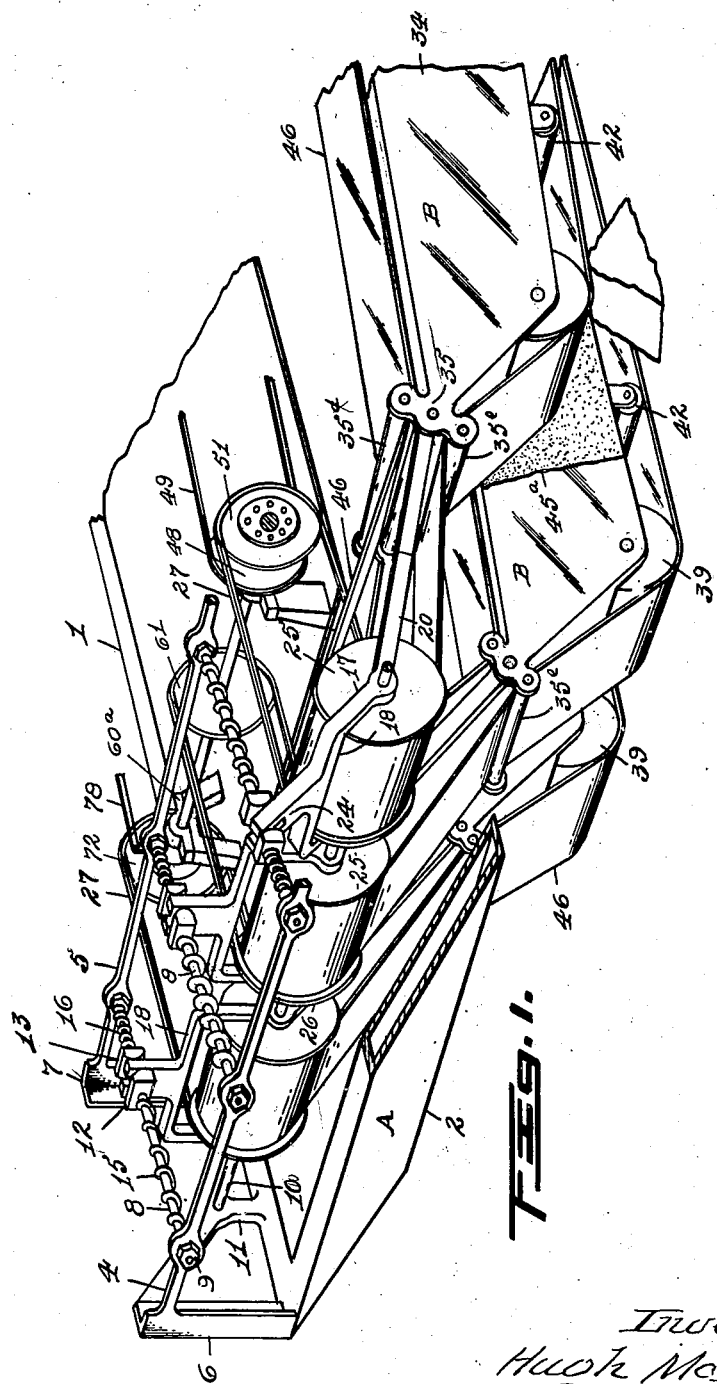

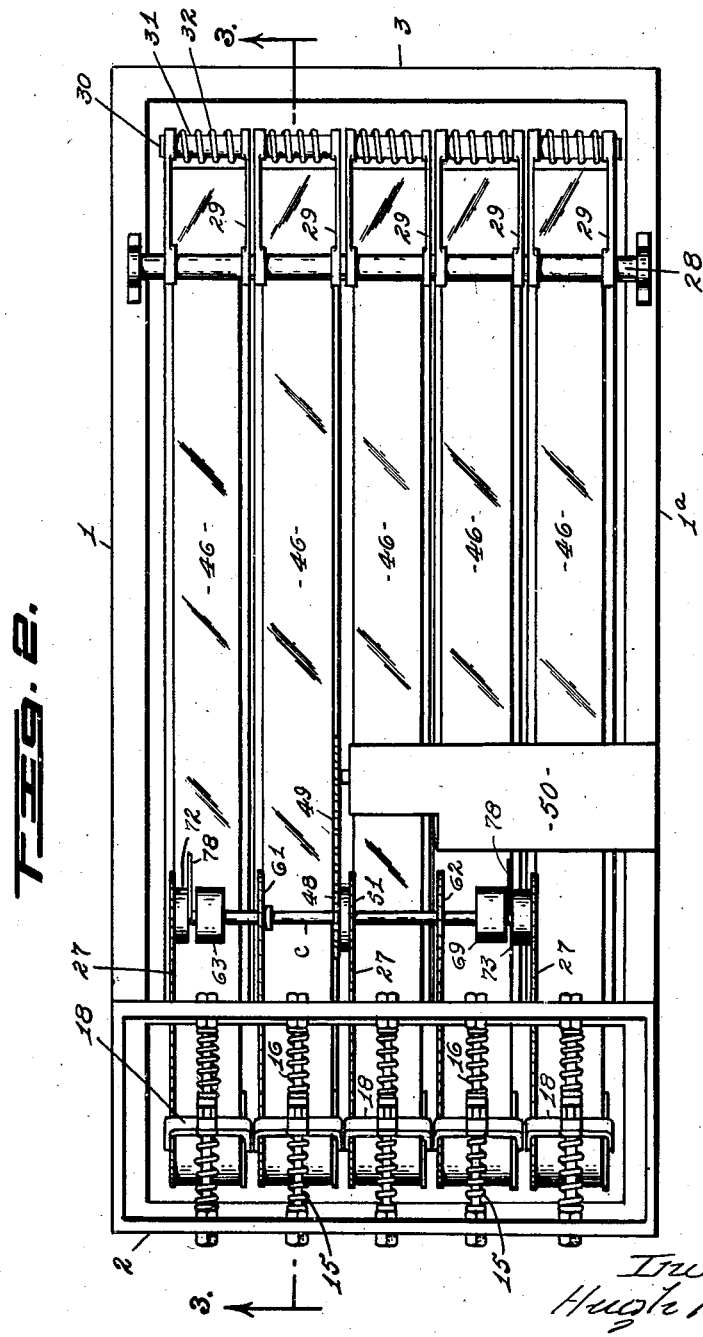

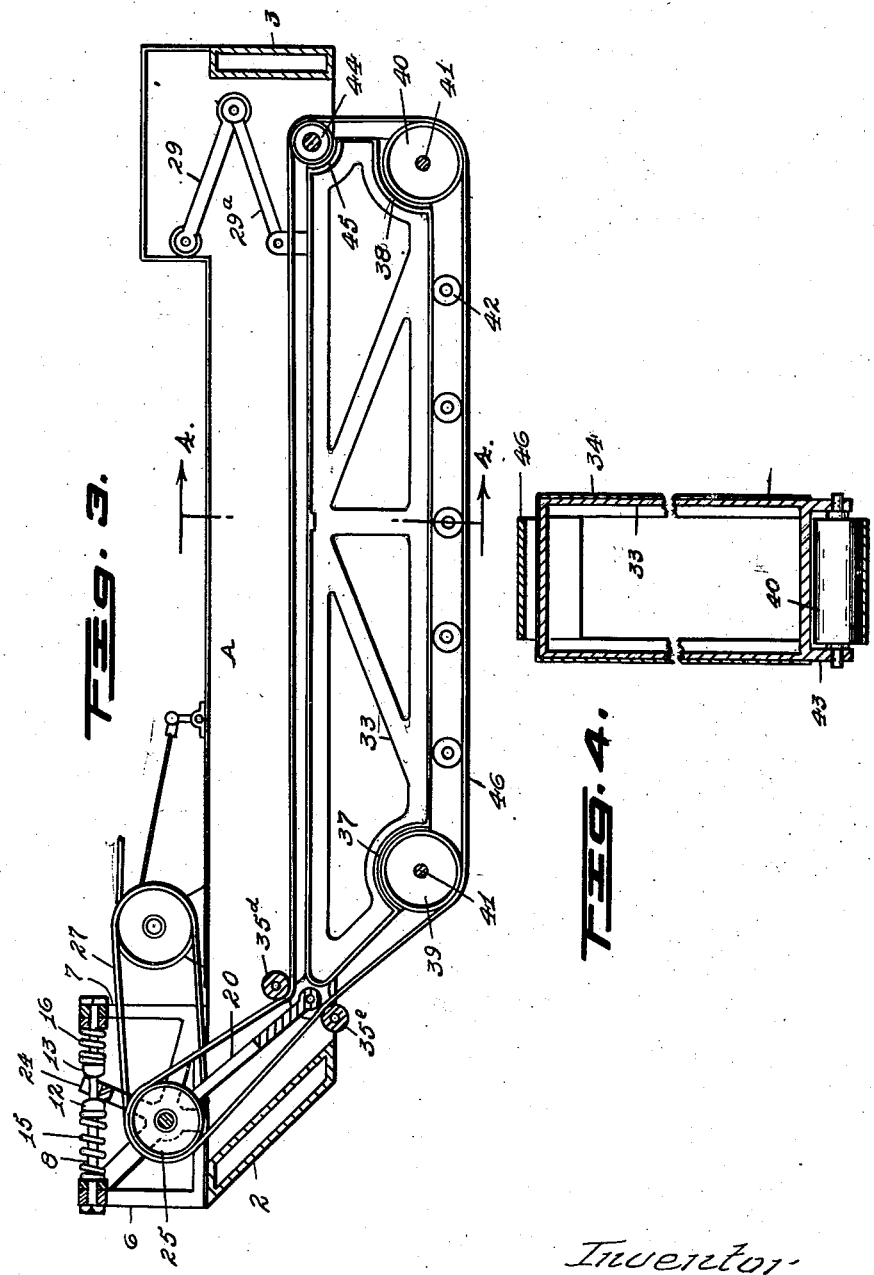

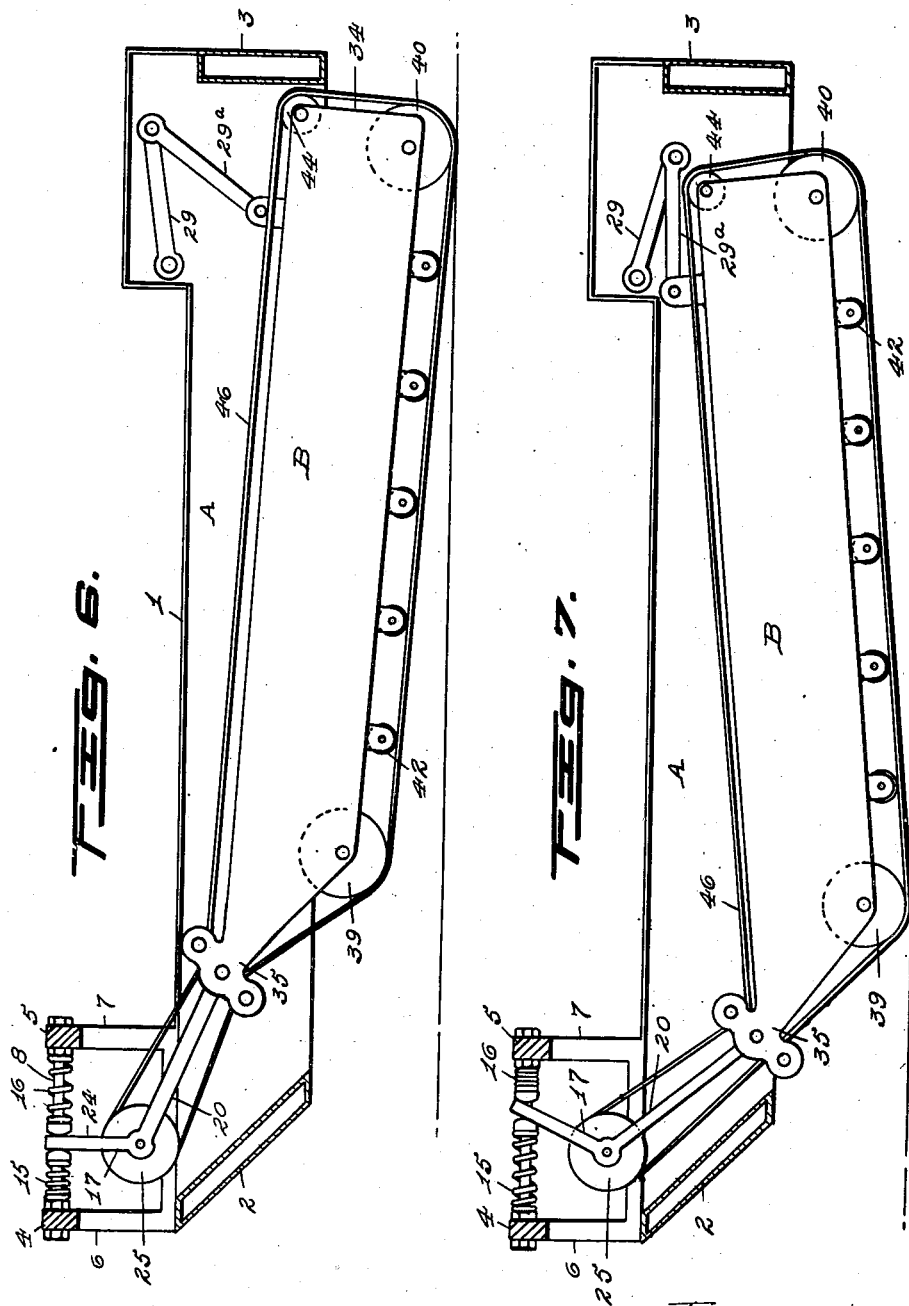

Nov. 5, 1940.     H. McINTYRE     2,220,418
VEHICLE
Filed March 11, 1939     8 Sheets-Sheet 6
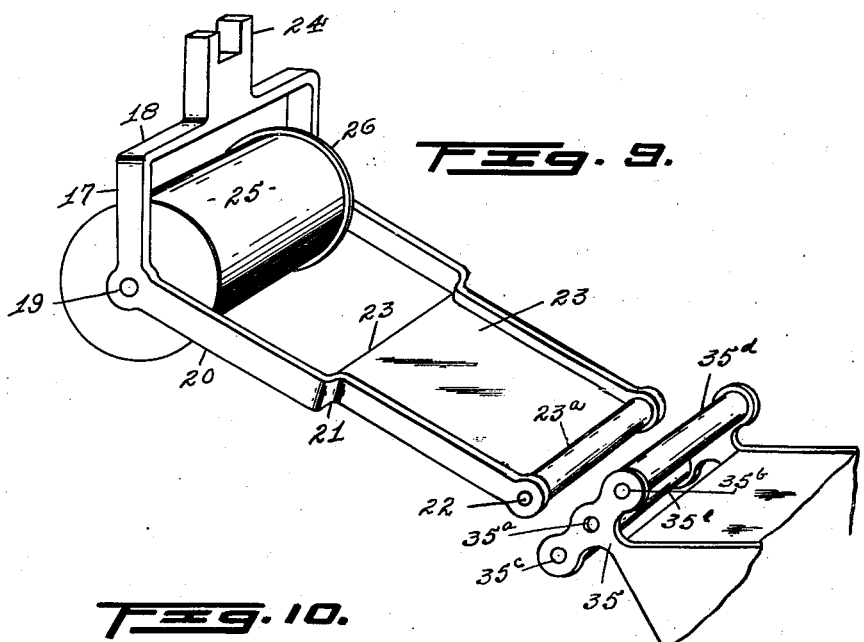
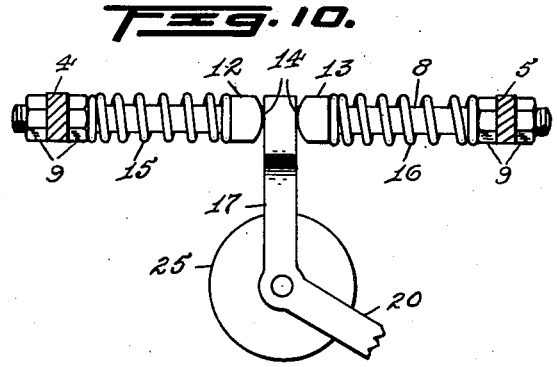
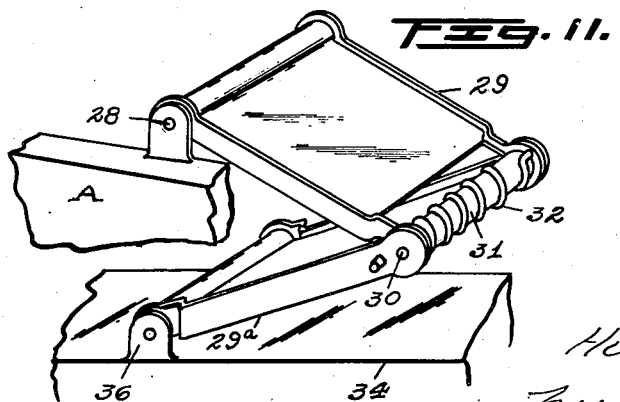
Inventor
Hugh McIntyre
By ........
Atty.

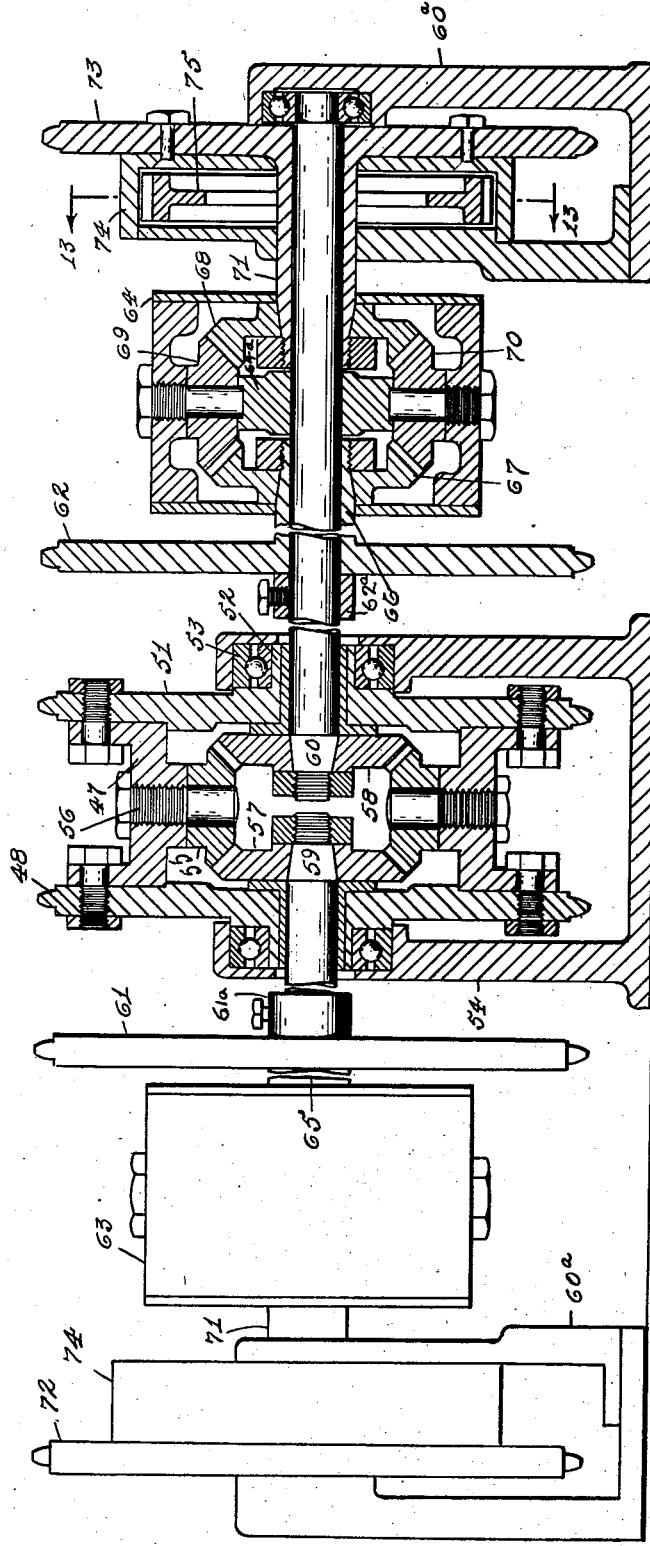

Nov. 5, 1940.   H. McINTYRE   2,220,418
VEHICLE
Filed March 11, 1939   8 Sheets-Sheet 8
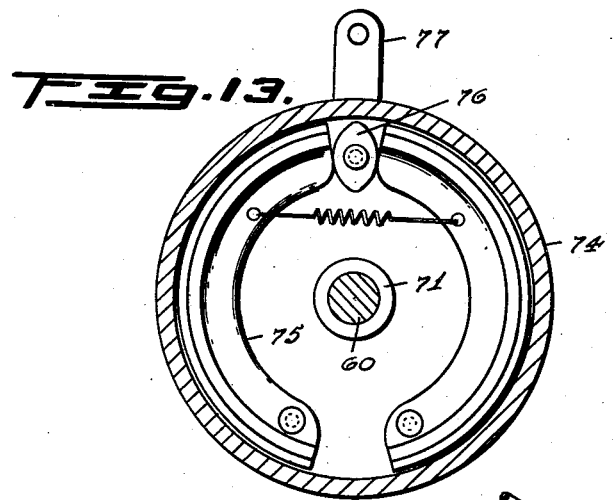
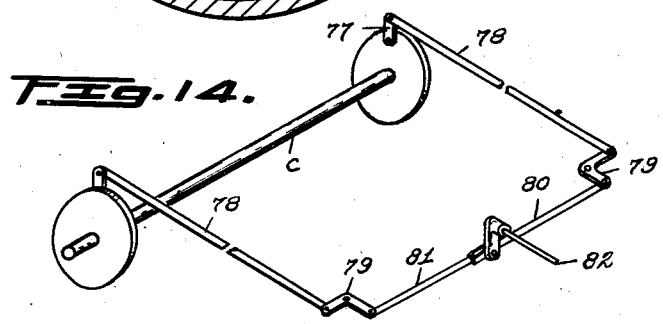
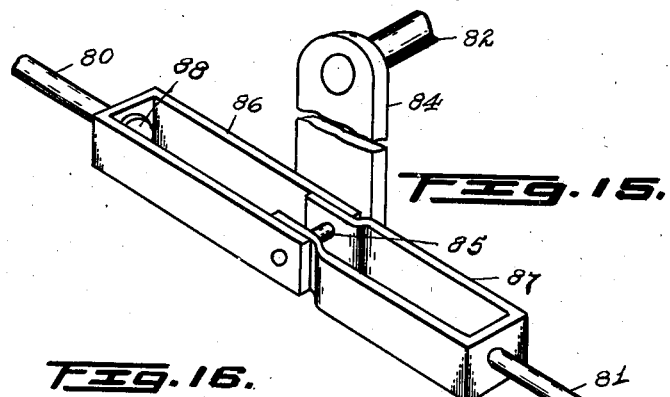
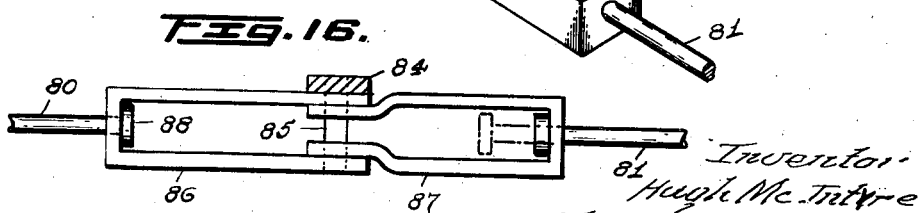

Patented Nov. 5, 1940

2,220,418

UNITED STATES PATENT OFFICE 2,220,418

VEHICLE

Hugh McIntyre, Kirkland Lake, Ontario, Canada

Application March 11, 1939, Serial No. 261,327

13 Claims. (Cl. 115—1)

The invention relates to improvements in vehicles as described in the present specification and shown in the accompanying drawings that form a part of the same.

The main objects of the invention are to provide a simple and efficient vehicle adapted for travelling over undeveloped and rough country, over water courses in summer and winter, and over unbroken and deep snow or alternatively a vehicle having an extremely great propulsive bearing surface in proportion to its weight, so that unusually heavy loads, say for military purposes, can be carried over unprepared ground; to provide a vehicle of few and simple parts which will not easily become damaged, and which can be easily and quickly repaired in case of damage due to unusual strain; to provide a vehicle comprising a plurality of independent tractor elements adapted to rise and fall independently of one another whereby to minimize the shock when passing over obstacles and to prevent twisting of the chassis; to provide a driving means whereby the central tractor element shall always have a direct drive from the engine, and whereby the relative speeds of the other tractor elements are controlled automatically and thus facilitate the operation of the vehicle upon deviation from a straight course; and generally to provide a simple, efficient and sturdy vehicle, which can be easily steered, will afford the maximum of comfort and which can be produced at a reasonable cost.

The description which follows sets out the main points of the invention with particular reference to the type preferred for the conveyance of moderate loads over snow, water and rough country, but does not apply exactly to a vehicle covered by the same general design which would be of sturdier construction and would not be intended to float on water, as its use would be that of carrying extremely heavy loads over unprepared ground.

The invention consists broadly of a main frame of tubular construction adapted to provide buoyancy in travelling over water, a plurality of tractor devices constituting, in this particular design, floating tanks cradled at their opposite ends in said main frame, whereby the front and rear ends of each tractor will rise and fall independently of each other and independently of the other tractors, each of said tractors being driven individually by belt, chain or gear from a countershaft, the central tractor having a constant drive at engine speeds; and a countershaft through which said tractors are driven which includes a series of differentials so related as to provide automatically for correct relative speeds of said tractors when the vehicle is travelling on the arc of a circle; and steering mechanism cooperating with said countershaft for controlling the direction of travel of the vehicle. In the case of a vehicle intended to carry heavy weights, the design (drawings of which are not given) would be varied to provide greater strength of the chassis frame, and in the cradling and construction of the tractors, the requirements of lightness and buoyancy being ignored.

In describing the invention, reference will be made to the accompanying drawings in which—

Figure 1 is a perspective view, partly in section, of the forward part of my improved vehicle with the body omitted.

Figure 2 is a plan view of the structure shown in Figure 1, complete.

Figure 3 is a longitudinal sectional view through the vehicle, taken on the line 3—3 of Figure 2.

Figure 4 is a vertical sectional view taken on the line 4—4 of Figure 3.

Figure 5 is a side elevation of the vehicle.

Figure 6 is a side elevation, partly in section, showing the forward end of one of the tractors raised as when passing over an obstacle.

Figure 7 shows the structure illustrated in Figure 6 with the parts in the positions they assume when the rear end of the traction device is passing over an obstacle.

Figure 8 is a plan view, partly in section, of the elements comprising the swinging connection between each of the tractor frames and the main frame at the rear end of the vehicle.

Figure 9 is a perspective view of the forward end of one of the tractors and its swinging support.

Figure 10 is an enlarged detail showing the connection between the top end of the support shown in Figure 9 and the main frame.

Figure 11 is a perspective view of a portion of the rear end of the vehicle showing the swinging connection between one of the traction devices and the main frame.

Figure 12 is a side elevation partly in vertical section, through the countershaft employed in driving my vehicle.

Figure 13 is a cross sectional taken on line 13—13 of Figure 12.

Figure 14 is a diagrammatic view showing the connection between the steering rod and the brake drums.

Figure 15 is a perspective view of the lower end of the steering post.

Figure 16 is a detailed view showing the connection between the brake rods and the steering post.

Like numerals of reference indicate corresponding parts in the various figures.

In the preferred embodiment of my invention I employ a main chassis frame A of rectangular shape in plan and comprising sides 1, 1a and front and rear ends 2 and 3 respectively.

The chassis frame A is of tubular construction so as to provide, when the vehicle is travelling over water, a balancing buoyancy which will effectually prevent upsetting. The front end 2 of the frame A is preferably inclined inwardly from its top edge, as is shown clearly in Figure 1.

4 and 5 are supporting members extending across the chassis frame A in spaced parallel relation to each other near the front of the vehicle and being supported a considerable distance above said frame in oppositely disposed aligned pairs of uprights 6 and 7 respectively located at opposite sides of the main frame.

The supporting members 4 and 5 are connected at intervals throughout their length by rods 8 equi-distant from each other and in number corresponding to the number of traction elements employed in the vehicle. The rods 8 preferably extend at their opposite ends through the corresponding members 6 and 7 and may be secured by lock nuts 9, or otherwise as desired.

10 is a shaft extending transversely of the vehicle midway between the members 4 and 5 and on a lower plane than said members, said shaft being rigidly supported at its opposite ends in aligned uprights 11 extending upwardly from the opposite sides of the main frame A.

It is of course to be understood that the members 6, 7 and 11 at each side of the vehicle may be independent of one another or may be connected together as shown in Figure 1.

Slidably mounted on each of the rods 8 are two bearing blocks 12 and 13, the inner opposed surfaces of which are cut away along the top and bottom edges to provide opposed rounded faces 14 and these blocks have resilient pressure exerted on them tending to force them to meeting engagement in the longitudinal centre of the rod on which they are mounted by coil springs 15 and 16 encircling said rod behind the respective bearing blocks and at their outer ends bearing against the interior nuts 9, or the cross members if such nuts are not used.

17 are the front tractor supporting frames of which one is provided for each tractor employed in the vehicle, said frames each comprising spaced parallel arms closed at their one end, as at 18, and at points somewhat removed from said closed end, having aligned openings 19 whereby the frames are rotatably mounted along the shaft 10 in slightly spaced relation to each other and beneath the respective rods 8. The arms of each of the frames 17 are offset at a rearward and downward angle from their points of suspension on the shaft 10, as shown at 20, and are turned inwardly as at 21, intermediate of the length of the rearwardly extending portions, from which points they extend in parallel to their outer ends, which latter are enlarged somewhat and are provided with aligned openings for the reception of a pin 22.

That portion of each frame from the point 21 of reduction in width is preferably reinforced by an interior plate or other device 23, which at its outer end is turned to provide a sleeve 23a aligned with the openings in the opposed arms of the frame.

The closed top end of each of the frames 17 is provided with a centrally disposed bifurcated extension 24 extending upwardly and spanning the associated rod 8 between the block 12 and 13 of said rod.

As the blocks 12 and 13, between which the extensions 24 of the respective frames 17 are positioned, are urged by the springs 15 and 16 to meeting positions centrally of their respective rods 8, it will be apparent that the normal positions of those portions of the frames 17 above the shaft 10 will be vertical and that any upward, or downward, influence brought to bear on the rear end of any of said frames will cause a rocking movement of the bifurcated top end of the frame affected and cause the spreading of the particular blocks 12 and 13 and that upon the discontinuance of said influence on the rear end of the said frame, the springs 15 and 16 will urge the blocks towards each other and thus return the top portion of the frame to its normal vertical position, and the rear end to its normal position also with the extreme end on a slightly lower plane than the bottom of the chassis frame A.

25 are driven pulleys corresponding in number to the frames 17 and one being rotatably mounted on the shaft 10 within each of said frames. Each of said pulleys is provided at one of its ends with a flange, or sprocket 26 for the reception of a driving belt or chain 27.

28 is a shaft extending transversely of the chassis frame A near the rear end thereof, said shaft being supported at its ends in opposed brackets extending upwardly from the opposite sides of said chassis frame.

Rotatably mounted at their forward ends on the shaft 28 in endwise relation to each other are a plurality of rearwardly extending spring shackles 29, said shackle devices corresponding in number to the frames 17 and being in alignment with the respective frames. The rearmost section 29a of each of said shackles is rotatably mounted on a pin 30 which extends through the interfitting ends of the front and rear section of each shackle and through a sleeve 31 with which each front section is provided, and said rear sections are folded downwardly and forwardly beneath the respective front sections and are each spring-pressed downwardly by means of a coil spring 32 encircling the corresponding sleeve 31 and secured at one end to one arm of the front section and at its other end to the corresponding side arm of the rear section.

B denotes the tractors, or tread carriers, generally, which correspond in number to the number of front supporting frames 17 and are slung in close parallel arrangement longitudinally of the vehicle between the respective front frames or springing devices 17 and their associated rear spring shackles 29, said tractors being somewhat shorter than the main frame and having their respective front ends inclined inwardly from the front top edges.

The tread carriers B each consist of an elongated frame 33 substantially rectangular in cross section, enclosed in a casing 34, whereby each tread carrier constitutes a separate floating tank.

Each tread carrier is provided with forward extensions 35 adapted for interfitting pivoted connection with the rearmost end of a front springing frame 17, the said extensions being substantially T shape in side elevation with openings 35a, 35b, and 35c in each of the heads thereof, the central openings being adapted to receive the pin 22 from the frame 17 and the openings 35ᵇ and 35ᶜ constituting bearings for idle rollers 35ᵈ and 35ᵉ positioned respectively above and below the sleeve 23ᵃ of the frame 17 with which the carrier is associated. Each carrier is also provided near its rear end with opposed brackets 36 in which the free end of the corresponding rear shackle section 29ᵃ is journalled.

It will thus be seen that each tread carrier is spring mounted at each of its ends and is free to move under impact independently of the other carriers, thus making it unnecessary for the whole vehicle to be affected by contact with a relatively small obstacle, the carrier directly contacted by the obstacle only being affected and rising gently at its forward end until the obstacle has passed the longitudinal centre of the carrier after which the forward end will fall, through the action of the springs 15 and 16 on the top end 24 of the front springing device, and the rear end will rise to pass over the obstacle, after which it will descend, due to the action of the rear coil spring 32.

The lower corners of the front and rear ends of each tread carrier are preferably recessed transversely as at 37 and 38 in such recesses are positioned idle rollers 39 and 40 respectively, which rollers are mounted on shafts 41 suitably supported at their opposite ends in the opposing side walls of the frame 33.

Each tread carrier is provided along its bottom, between the idle rollers 39 and 40, with a number of relatively small idle rollers 42 suitably journalled between downward extensions 43 from the opposite sides of the frame 33.

Each tread carrier is also provided with a transversely disposed idle roller 44 positioned in the top rear corner, such corner preferably being recessed as at 45 to receive said roller.

The tread carriers are preferably positioned very closely together so as to effectually prevent stones and other matter entering the space between adjacent carriers and to prevent, as far as possible, dust from entering such space it is desirable that one, or both, of the meeting walls of adjacent carriers be covered with felt or other material sufficiently thick to provide frictional engagement between said adjacent carriers. Such material, as shown at 45ᵃ in Figure 1 may, if desirable, be provided with a lubricant.

46 are driving belts, of which one is provided for each carrier B. The belt of each carrier is adapted to extend around the carrier longitudinally in engagement with the various rollers 39, 40, 42 and 44 and to extend forwardly and span the sleeve 23ᵃ between the idle rollers 35ᵈ and 35ᵉ at the apex of the carrier and thence upwardly around the corresponding driven pulley 25.

While the driven members 46 have been designated and shown herein as belts and are preferably constructed of balata or other woven belting covered with rubber and having a suitable traction providing surface, it is of course to be understood that applicant is not limited to this form of drive as any of the well known types of driving devices such as chains, may be employed.

C denotes generally a countershaft through the medium of which motion is imparted to the pulleys 25 and consequently to the belts 46 and by means of which the relative speeds of the various tractors are automatically graduated to suit the distance each has to travel in turning the arc of a circle.

The countershaft which I have designed is a distinct departure from the conventional type and contains many new and novel features which are being made the subject matter of a separate application for Letters Patent but as the successful operation of my herebefore described vehicle is greatly facilitated by the employment of this countershaft, a brief description of same such as will clearly describe the operation of my vehicle, will be given.

The countershaft extends transversely of the chassis frame and may be supported in any desired manner rearwardly of the pulleys 25.

My countershaft consists of a main differential and a series of subsidiary differentials by means of which the relative speeds of the multiple belt treads are automatically controlled and the number of such subsidiary differentials is dependent upon the number of tractors and belts embodied in the vehicle, as the vehicle shown in the drawings and described herein embodies five tractors and their driving belts a countershaft suitable for the driving of such vehicle will be described herein.

47 is the main differential casing, to one of the outer sides of which is fixedly secured a sprocket 48 (pulley or gear) having a driving connection 49 with the engine (the particular construction of which is not shown herein and is merely designated by the numeral 50), and to the other side of which is fixedly secured a similar pulley, gear or sprocket 51 connected by the chain or belt 27 with the central driven pulley 25, thus constituting a direct and constant drive from the engine to the central pulley. The sprockets 48 and 51 are provided with hubs 52 suitably journalled in bearings 53 in the main frame 54.

55 are planet pinions positioned between the sprockets 48 and 51 and held in position by suitable spindles 56 threading through the casing, said pinions engaging oppositely disposed sideshaft pinions 57 and 58 which are fixedly mounted on the inner spaced ends of the main shaft sections 59 and 60, which latter extend outwardly from opposite sides of the casing through the hubs 52 and at their extreme outer ends are journalled in suitable bearings in supports 60ᵃ.

63 and 64 are subsidiary differential casings fixed immovably through central webs 64ᵃ to the main shafts 59 and 60.

The subsidiary differentials are each substantially similar to the main differential, including, as they do, side pinions 67 and 68 and planet pinions 69 and 70. These side pinions 67 and 68 are fixed to sleeves 66 and 71 which are rotatably mounted on the main shafts 59 and 60, extending inwardly and outwardly to carry sprockets 61 and 72 and 62 and 73 respectively, which sprockets (pulleys or gears) are aligned with the respective sprockets (pulleys or gears) of the driven pulleys 25 and are connected therewith by chains, belts or gearing. Thrust blocks 61ᵃ and 62ᵃ are provided to take up the end thrust on the sprockets 61 and 62.

The endmost sprockets 72 and 73 are each provided with a brake collar 74 within each of which is mounted the internal expanding brake sections 75 and an appropriate spreader, indicated by the numeral 76, which latter are controlled by suitable levers 77 having connection with suitable brake rods 78.

To understand the action of the braking device for steering the vehicle, it has to be remembered that all the tractors are held to the ground by independent springing. It will be obvious then that when one of the brakes is applied to slow down the movement of one or other of the side shafts 59 or 60, the other side shaft will rotate at a correspondingly greater speed because the casing of the main differential—and so the central tractor—is driven at a constant speed and is unaffected by the braking. This greater speed of one side shaft over the other reacts directly on the attached subsidiary differentials 63 and 64 and through them the relatively correct speeds of the sprockets 61 and 72 and 62 and 73 will result automatically. The rotation of each sprocket is carried directly to its tractor drive and thus the variable speeds increasing from the braked side to the opposite side will cause the vehicle to deviate from a straight line according to requirement.

Applicant does not wish to limit himself to any specific means of applying the brakes as brakes suitable to the present purpose and means for applying same are well known, but for purposes of illustration one form of brake applying, or steering, device is shown wherein the brake rods 78 have pivoted connection at their one end to the one end of centrally pivoted right angle members 79, the other ends of which right angle members have connected to them the one end of the rods 80 and 81 which extend towards one another but do not meet.

A steering rod 82 suitably mounted in the vehicle and having a suitable handle, or wheel 83 conveniently located for use by the driver is provided and this rod or post has a fixed crank arm 84 extending at right angles thereto and at the inner end thereof. The lower end of the crank arm 84 has a pin 85 extending laterally therefrom near its free end and this pin extends through the overlapping ends of a pair of U-shaped members 86 and 87, through the closed ends of which loosely extend the respective ends of the rods 80 and 81, which latter are each provided with a head 88 to prevent withdrawal of the rods.

It will be obvious that upon rotation of the steering rod in one direction, the crank arm 84 will be moved in the opposite direction and will move the connected members 86 and 87 therewith, causing a pull on the rod 80, or 81, according to the direction of rotation of the steering rod, and, through the pivoted members 79 and the rod 78 on the side affected, causing a pull on the arm 77, to expand the brake members 75. Upon the movement of the members 86 and 87 the rod 80, or 81, in the direction of movement of said members will move inwardly, as shown in Figure 16, and will not resist the movement of said members.

It is of course to be understood that while the brake elements are shown as operating on the outermost sprockets they may be located at any desired points along the countershaft.

In the operation of this invention the power is transmitted from the engine to the countershaft through the drive 49 operating over the main differential sprocket 48 and so long as the brakes are free the power will be transmitted evenly throughout the length of the countershaft driving all of the sprockets 51, 61, 62, 72 and 73 at the same rate of speed and as each of the last mentioned sprockets is connected by a belt, or other device, 27, to a pulley 25 over each of which operates a tractor belt 46, all of the tractors will be driven at like speed and the vehicle will travel in a straight course.

When it is desired to deviate from a straight course, the steering wheel 83, or other brake control device, is operated to cause application of the brake on the side of the vehicle corresponding to the desired direction of deviation. This application of the brake causes the sprocket first affected to slow up, whereupon the speeds of the successive remaining sprockets along the countershaft and consequently speeds of the associated tractors will be successively increased and cause the vehicle to pivot around the slowest moving tractor. By proper application of the brakes the vehicle can be easily steered in any desired direction.

The method of cradling the tractors individually in the front and rear springing devices 17 and 29 permits of the tractors automatically adjusting themselves to the ground surface and ensures constant ground contact by all. When a rise in ground surface, or a stone or other object, is encountered the tractor directly contacted thereby only is affected, the forward end first being raised and thereby causing the bifurcated top end 24 of the front springing device to spread the blocks 12 and 13 on the corresponding shaft 8 and when the tractor has progressed to the extent that the longitudinal centre thereof has passed over the object the springs 15 and 16 force the said blocks towards one another and thereby return the front springing device and the front end of the tractor to their normal positions with the front of the tractor in engagement with the ground and the rear end of the tractor in the meantime having been forced upwardly against the pressure of the spring 32 of the rear spring shackle. When the tractor has passed over the object, the rear end is forced downwardly by said spring 32 to the ground level. When the obstacle contacted is of sufficient size to contact two or more of the tractors such tractors move independently of one another in the manner just described.

As the tread carriers are constructed in the form of tanks, the vehicle will operate with equal facility over water, the method of resiliently suspending the tractors independently of each other, whereby the front and rear portions of each tractor will rise independently of the other end and of the other tractors, being of advantage when traversing choppy water as well as when passing over uneven ground.

While I have illustrated and described the preferred form of construction for carrying out my invention, this is capable of variation and modification without departing from the spirit of the invention. I, therefore, do not wish to be limited to the precise details of construction set forth, but desire to avail myself of such variations and modifications as come within the scope of the appended claims.

What I claim is:

1. In a vehicle, a frame, a shaft supported by said frame and extending transversely thereof near the front end, a plurality of front springing devices journalled in endwise spaced relation to each other along said shaft, a shaft supported by said frame and extending transversely thereof near the rear end, a plurality of rear springing devices journalled in endwise spaced relation to each other along the last mentioned shaft, said springing devices being in longitudinal alignment with the respective front springing devices, a plurality of belt carriers extending longitudinally of the vehicle in horizontal alignment, each of said belt carriers being supported at its respective ends by a front springing device and the aligned rear springing device, belts operating over the respective belt carriers, and means for driving said belts.

2. A vehicle according to claim 1 in which each of said front springing devices comprises a frame closed at its top end and including spaced parallel arms, rotatably journalled intermediate of their length and having rearwardly offset extensions adapted for pivotal connection with the forward end of a tractor, said frame having a bifurcate upward extension from the top end thereof, a shaft extending transversely of said frame loosely through said bifurcate extension, whereby said frame is permitted to rock under the influence of said tractor, and spring means exerting pressure on the opposite sides of said extension to urge said frame to its normal position.

3. A vehicle according to claim 1 in which each of said rear springing devices comprises a pair of hingedly connected frames folded one over the other, the free end of one of said sections having pivoted connection with the vehicle frame and the free end of the other of said sections having pivoted connection with a tractor frame, and spring means exerting a spreading influence on said sections.

4. In a vehicle, a frame, a shaft extending transversely of said frame near the front end thereof, a plurality of front springing devices rotatably mounted in endwise spaced relation to each other on said shaft, said springing devices each including spaced parallel arms extending downwardly and rearwardly of said shaft, a plurality of pulleys mounted on said shaft, one of which pulleys is positioned between the arms of each of said front springing devices, a plurality of rear springing devices supported at their one ends from the vehicle frame, a plurality of horizontally aligned belt carriers extending longitudinally of the vehicle in alignment with the respective pairs of front and rear springing devices and having pivoted connection therewith, at their opposite ends, belts operating longitudinally around the respective belt carriers and their associated pulleys, and means for driving said pulleys.

5. A vehicle comprising a frame, a plurality of belt carriers mounted independently of one another within said frame, a countershaft including a series of cooperating differentials driving said belt carriers respectively and automatically controlling the relative speeds thereof when the vehicle is travelling on the arc of a circle, one of said belt carriers having direct connection with the source of power through said countershaft and being unaffected by the differential action.

6. A vehicle comprising a frame, driving means including a main differential and subsidiary differentials, a central belt carrier having direct driving connection with said driving means through said main differential, two or more subsidiary belt carriers at each side of said central belt carrier having their drive controlled by the differential action from said central belt carrier, said belt carriers being capable of independent vertical movement, an endless belt cooperating with each belt carrier, and means automatically controlling the relative speeds of the belts on said belt carriers upon deviation from a straight line through the direct road drive to the central belt.

7. A vehicle including a buoyant main frame, a series of independent buoyant belt carrying frames, an endless belt cooperating with each belt carrying frame, means on the main frame for receiving and driving each belt carrying frame, a countershaft including a series of cooperating differentials driving said belts respectively, the central belt having direct connection with the source of power through said countershaft and being unaffected by the differential action, means for supporting the forward end of each belt carrying frame to permit its independent vertical movement to compensate for road irregularities, and means carried on the main frame and connected to each belt carrying frame to automatically restore the forward end of the belt carrying frame to normal position following its vertical compensating movement.

8. A tractor having a main frame, a shaft supported on said frame, a series of belt receiving pulleys mounted for independent movement on the shaft, a belt carrying frame supported for independent vertical movement relative to the main frame, belts overlying and underlying each belt carrying frame and passing over the belt receiving pulley longitudinally aligned therewith, a lever fulcrumed on the shaft and connected to the forward end of each belt carrying frame to permit upward swinging movement of the forward end of said frame, said lever being extended above the belt receiving pulley and terminally formed as a fork, a rod supported in the main frame to engage in said fork, and spring means bearing on opposite sides of the fork to normally create pressure on the fork and on the lever to maintain the particular belt carrying frame in normal road engaging position.

9. A construction as defined in claim 8, including independent driving means for each belt receiving pulley, and means whereby such driving means may be manually speed-controlled to vary the traveling speed of the belts for turning purposes.

10. A construction as defined in claim 8, including a toggle lever connected to the main frame and to the rear end of each belt carrying frame, said toggle lever permitting independent vertical movement of the carrying frame to which it is connected, and a spring cooperating with the toggle lever to operate said lever to maintain the belt carrying frame in normal road engaging position.

11. A construction as defined in claim 8, wherein each belt carrying frame includes a hollow sealed casing with belt engaging pulleys mounted below the casing.

12. A construction as defined in claim 8, wherein the lever at the forward end of each belt carrying frame is a rigid angle lever comprising spaced bar-like elements between the belt receiving pulley and the belt carrying frame, with a plate secured between said bar-like elements for bracing purposes.

13. A construction as defined in claim 8, wherein the belt receiving frame at the end connected to the lever is formed with upper and lower rollers in spaced relation for guiding the belt to and from the belt receiving pulley.

HUGH McINTYRE.